Oct. 31, 1933.  W. H. GRUENHAGEN  1,932,622

PLUG BAIT WITH GROOVES

Filed Feb. 23, 1932

INVENTOR
WILLIAM H. GRUENHAGEN
BY
ATTORNEYS

Patented Oct. 31, 1933

1,932,622

UNITED STATES PATENT OFFICE 1,932,622

PLUG BAIT WITH GROOVES

William H. Gruenhagen, St. Paul, Minn.

Application February 23, 1932
Serial No. 594,467

9 Claims. (Cl. 43—46)

This invention relates to a fish bait and particularly to a bait of the plug type. Such plug baits are now commonly used for casting and trolling. It is desirable in such a bait to have one which is attractive and bright in color and appearance and one which has an active motion when drawn through the water. While plugs have been made in various colors and to simulate minnows of different kinds, red and white have been predominantly used as the colors. As a general rule, these colors appear to make the most attractive lures.

It is an object of this invention, therefore, to provide a simple and efficient plug of general cylindrical form tapered at its rear end and having a plurality of slots formed therein at its front end. It is a further object of the invention to provide a plug of general cylindrical form tapered at its rear end and having an inclined front end, said plug also having a pair of slots at its front end opening into its top and front surface, said slots converging toward the lower front end of said plug.

It is a further object of the invention to provide a plug such as set forth in the preceding paragraph, in which said slots are symmetrically disposed about a central vertical axis and preferably tapered toward their bottoms, being substantially of V-shape in cross section.

It is more specifically an object of the invention to provide a plug of general cylindrical shape having a front end inclining from its top forwardly and downwardly to substantially its lower surface and having a pair of slots opening into its top and front surface, said slots converging toward the lower front end of the plug and forming a tongue therebetween, said plug having means for holding a metal plate thereon embracing said tongue and having a portion disposed at the lower front portion of said plug, said plug preferably being provided with several of said plates adapted to be alternately used.

These and other objects and advantages of the invention will be fully set forth in the following description made in connection with the accompanying drawing, in which like reference characters refer to similar parts throughout the several views and in which:—

Figure 2:
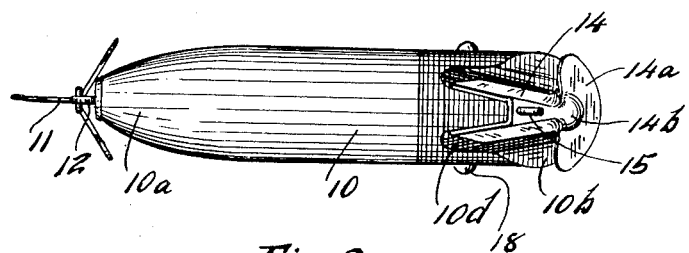
Fig. 2 is a top plan view of the plug.
Figure 1:
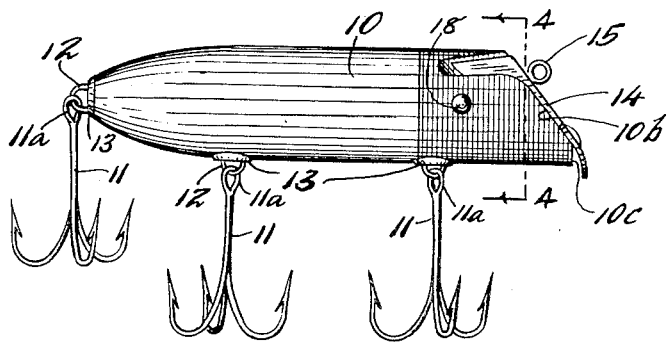
Fig. 1 is a view in side elevation of the plug with the hooks depending vertically.

Referring to the drawing, a plug is shown comprising a body 10. While said body may be varied somewhat in shape and cross section, in the embodiment of the invention illustrated it is shown as of general cylindrical shape tapering to almost a point at the rear end 10a. Said plug has secured thereto a plurality of hooks 11 and while these may be varied in form, they are illustrated as triple hooks. The same have eyelets 11a which are attached to screw eyes 12 screwed into the rear end of plug 10 and at spaced points along the lower side thereof. Washers or collars 13 engage the plug through which the screw eyes 12 extend. The body 10 has a front surface 10b formed thereon inclined downwardly and forwardly from top to bottom and has quite a small vertical surface 10c at its lower front portion. A plurality of slots 10d are formed in the plug and while these might be varied in shape, in the embodiment of the invention illustrated they are shown as substantially of V-shape, thus tapering toward their bottoms. Said slots converge toward the lower front end of the plug and open into the front surface 10b and into the top curved surface of the plug. The bottoms of said slots extend upwardly and rearwardly from the front end thereof. It will be seen that the slots are symmetrical about a central vertical plane of the plug and that they form a central portion or tongue 10e of substantially trapezoidal shape in cross section and tapering toward its front end.

Figure 3:
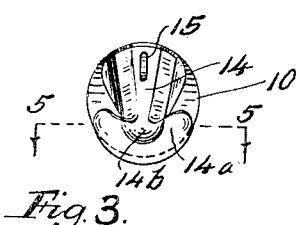
Fig. 3 is a view in front elevation of the plug.
Figure 4:
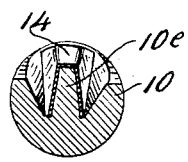
Fig. 4 is a vertical section taken on line 4—4 of Fig. 1.
Figure 5:
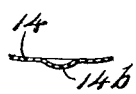
Fig. 5 is a horizontal section taken on line 5—5 of Fig. 3.

A metal plate 14 is provided, bent to extend across the front and along the sides of the tongue 10e, said plate having a lower portion 14a symmetrically disposed with relation thereto and which is shown in Fig. 3 as substantially of segmental form, its lower edge following substantially the outline of the end of body 10 but extending somewhat below the same. Said portion 14a has a central portion 14b of concavo-convex form. This portion 14b in Fig. 3 is shown as having its convex side outwardly. Plate 14 can be attached to the tongue 10e by any suitable means and in the embodiment of the invention illustrated it is shown as held thereon by a screw eye 15 which forms the means of attachment of the plug to the line or leader.

Figure 6:
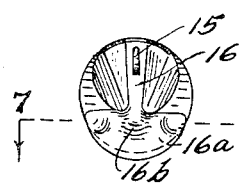
Fig. 6 is a view in front elevation showing a modified form of plate.
Figure 7:
Fig. 7 is a horizontal section taken on line 7—7 of Fig. 6.

In Fig. 6 the plate 16 is shown having a segmental portion 16a with a central concavo-convex portion 16b, the concave side being disposed outwardly. Plate 16 like plate 14 embraces the sides of tongue 10e.

Figure 8:
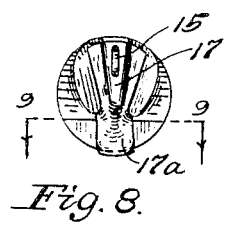
Fig. 8 is a view in front elevation showing another modification.
Figure 9:
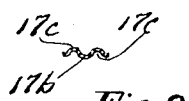
Fig. 9 is a horizontal section taken on line 9—9 of Fig. 8, said sections being taken as indicated by the arrows.

In Figs. 8 and 9 another form of plate 17 is shown, embracing the tongue 10e, and plate 17 has a lower central portion 17a of general rectangular shape with rounded corners. This portion 17a has a central bulge or concave portion 17b and grooves 17c are formed at each side thereof. The lower edge of portion 17a is slightly concave or scoop-shaped. It will be understood that either one of the plates 14, 16 or 17 can readily be placed on the plug and either one may be used to suit the desire of the fisherman. The body 10 has beads 18 at either side which preferably will be made of glass or similar material. These beads simulate eyes.

In operation the line or leader will be attached to the screw eye 15. Such plugs are usually used with the standard leader which has a snap hook at one end adapted to engage in the eyelet 15. The plug can either be cast and reeled in, or it can be used for trolling. The grooves 10d and the plate on the plug cause the plug to move from side to side and take a sinuous course as it moves through the water. One end of the plug preferably, as indicated in the shading, is of red color, while the rear portion is white. These colors, together with the metal plate which preferably is nickel-plated or chromium-plated, gives a bright and flashy effect by the reflection of the light as it moves through the water, and the bait makes a very attractive lure for the fish. The water engaged by the lower portion of the metal plate and the front end of the plug is relieved by moving rearwardly through the slots 10d. The slots increasing in width toward the top permit the water to flow freely therethrough. The slots being symmetrical at each side of the central plane through the plug, steady the plug and limit to some extent its sidewise motion, so that a very desirable and regular sinuous motion is had.

The plate 16 when used, tends more to cause the plug to dive and move at greater depths, owing to the concave outer side of the portion 16b. The plate 14 having the portion 14b convex at its outer side, does not have this diving tendency and may be used for shallower fishing. The plate 17 is somewhat concave at its outer lower end and is a medium between the two plates 14 and 16.

From the above description it is seen that applicant has provided a very simple and efficient plug bait. The bait as stated forms a very attractive lure and has a very desirable motion in moving through the water. The same is easily and inexpensively made and there is very little work in assembling. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. A bait comprising a cylindrical plug tapered to substantially a point at its rear end, a plurality of hooks pivotally carried by said plug, one of which is at said rear end, said plug having a front surface in a plane extending at an acute angle to the bottom element and axis of said plug, said plug having a plurality of slots extending longitudinally thereof at its front end opening into said front surface and the top of said plug, and inwardly of the outer edges of said surface.

2. A bait comprising a cylindrical plug tapered to substantially a point at its rear end, a plurality of hooks pivotally carried by said plug, one of which is at said rear end, said plug having a pair of slots adjacent its front end spaced from the side edges thereof and converging toward the end of said plug and spaced at equal distances from the central vertical axis of said plug, said slots opening into the top of said plug and the front end thereof.

3. A bait comprising a cylindrical plug tapered to substantially a point at its rear end, a plurality of hooks pivotally carried by said plug, said plug having a plurality of slots spaced from the side edges of said plug extending downwardly therein from its top, said slots tapering toward the bottom and converging substantially to a point at the lower front end of said plug.

4. A bait comprising a cylindrical plug tapered to substantially a point at its rear end, a plurality of hooks pivotally carried by said plug, said plug having an end portion inclined from its top to its bottom and having a pair of slots spaced from the sides of said portion disposed symmetrically with respect to a central vertical axis, said slots tapering towards their bottom and the bottoms tapering upwardly and rearwardly to the top of said plug, whereby water passes freely through said slots.

5. A bait comprising a cylindrical plug tapered to substantially a point at its rear end, a plurality of hooks pivotally carried by said plug, said plug having an inclined front end and a pair of slots formed therein inclining upwardly and rearwardly, thus forming a central tongue, and a metal plate fitting over said tongue extending down over the lower central portion thereof, the lower portion of said plate having a concavo-convex surface.

6. A bait comprising a cylindrical plug tapered to substantially a point at its rear end, a plurality of hooks pivotally carried by said plug, said plug having an inclined front end and a pair of slots formed therein inclining upwardly and rearwardly, thus forming a central tongue, and a metal plate fitting over said tongue and having a lower segmental portion following substantially the contour of the bottom of said plug, said segmental portion having a concavo convex central portion.

7. A bait comprising a cylindrical plug tapered to substantially a point at its rear end, a plurality of hooks pivotally carried by said plug, said plug having an inclined front end and a pair of slots formed therein inclining upwardly and rearwardly, thus forming a central tongue, and means for holding one of a plurality of metal plates on said plug, each of which fits over said tongue and extends therealong to substantially the bottom of said plug.

8. A bait comprising a cylindrical plug tapered to substantially a point at its rear end, a plurality of hooks pivotally carried by said plug, one of which is at said rear end, said plug having an inclined front end and a pair of slots formed therein spaced from the side edges of said front end and inclining upwardly and rearwardly, thus forming a central tongue, said slots tapering toward their bottoms and converging toward the front end of said plug, said tongue being of substantially trapezoidal shape tapering toward its front surface.

9. A bait comprising a substantially cylindrical plug tapered to substantially a point at its rear end, a plurality of hooks pivotally carried by said plug, said plug having an end portion inclined from its top to its bottom and having a pair of slots extending longitudinally of said end portion, said slots being spaced from the sides of said end portion the sides of said slots diverging from their bottoms toward their tops whereby water readily flows through and escapes from said slots, facilitating the movement of the plug through the water.

WILLIAM H. GRUENHAGEN.